(12) United States Patent
Antonsson

(10) Patent No.: US 6,398,490 B1
(45) Date of Patent: Jun. 4, 2002

(54) OSCILLATING MICROTURBINE

(75) Inventor: Erik K. Antonsson, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/477,159

(22) Filed: Jan. 4, 2000

Related U.S. Application Data

(60) Provisional application No. 60/114,950, filed on Jan. 4, 1999, and provisional application No. 60/123,530, filed on Mar. 5, 1999.

(51) Int. Cl.⁷ .................................................. F01D 5/02
(52) U.S. Cl. ........................................................ 415/141
(58) Field of Search ..................... 60/484, 327; 73/1.22, 73/1.27, 1.36, 1.41; 251/12; 137/829; 416/79, 80, 81, 82, 83; 415/141

(56) References Cited

U.S. PATENT DOCUMENTS 1,486,040 A * 3/1924 Schieferstein ................ 416/81
2,404,678 A * 6/1946 Wuensch ..................... 415/141
6,131,385 A 10/2000 Lewis, Jr. et al.

* cited by examiner

Primary Examiner—F. Daniel Lopez
Assistant Examiner—Igor Kershteyn
(74) Attorney, Agent, or Firm—Fish & Richardson P.C.

(57) ABSTRACT

An oscillating micro turbine is formed of a turbine that oscillates back and forth. The turbine is formed with a flexure which is pressed by fluid flow to oscillate in specified directions.

11 Claims, 4 Drawing Sheets

OSCILLATING MICROTURBINE

CROSS REFERENCE TO RELATED APPLICATIONS

This application claims the benefit of the U.S. Provisional Applications, serial No. 60/114,950, filed on Jan. 4, 1999, and serial No. 60/123,530, filed on Mar. 5, 1999.

BACKGROUND

A turbine is an element which moves based on fluid flow. Conventional turbines use a rotational element, which is rotated by the flow. For example, a gas turbine in an electrical power plant is caused to rotate based on expanded exhaust gas from a combustion chamber. Aircraft jet engines are another form of turbine which rotate to move gas and cause thrust from the moving gases.

Conventional turbines use a set of vanes arranged around the periphery of one or more rotatable disk. Using the example of a turbine arranged as a generator, fluid movement through the vanes rotates the disk and converts at least some of the energy in the fluid flow into rotational energy of the disk.

On the scale of a typical turbine, that is the macro scale, conventional rotating turbines work well. However, when a turbine is miniaturized below a certain minimal size, it becomes difficult to form rotating bearings.

SUMMARY

The present application teaches a system which uses an oscillating moving turbine. The oscillating turbine is displaceable from its reference position, and also can be restrained by a restraining mechanism. The restraining mechanism can be a flexural structural element.

The turbine can be connected to a motive element, e.g., a driven element such as an electrical power generation element, or to a fluid flow generating element, such as an engine.

BRIEF DESCRIPTION OF THE DRAWINGS

These and other aspects will now be described in detail with respect to the accompanying drawings, wherein.

DETAILED DESCRIPTION

Figure 1:
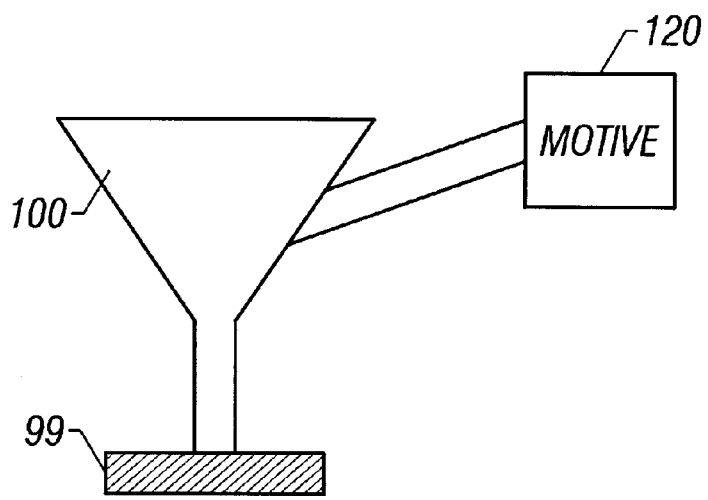
FIG. 1 shows a basic block diagram of an oscillating turbine.

FIG. 1 shows a block diagram of the basic system. An oscillating turbine element 100 is mechanically linked via link 110 to a motive unit 120. The oscillating turbine element 100 is connected to a housing 99. The motive element 120 can be an electrical power generation element, or an engine. If the motive element is an electrical power generation element, this can include a moving magnet or magnets along with one or more stationary coils of conductors.

Figure 2:
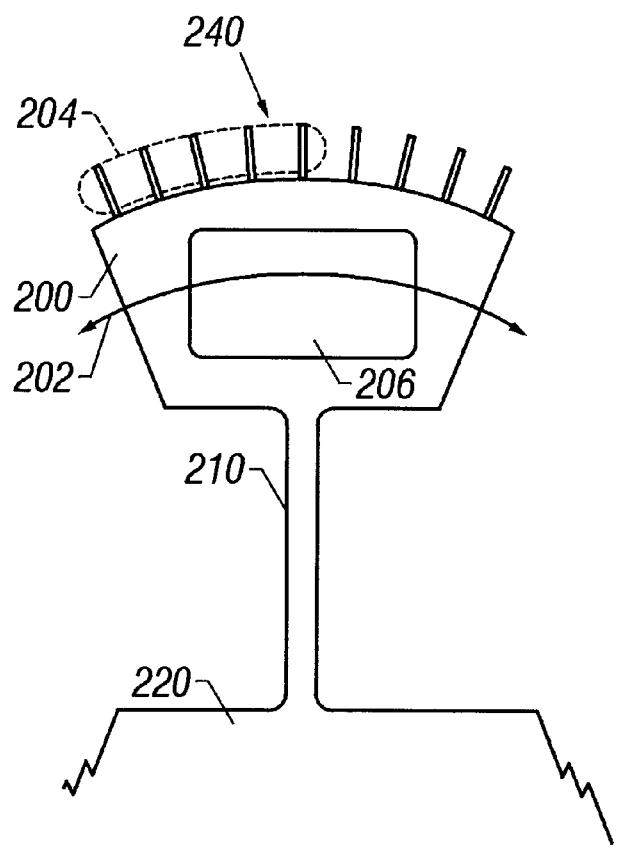
FIG. 2 shows the basic turbine system and its turbine blades.

FIG. 2 shows a basic oscillating turbine system. A turbine head 200 is mounted on a flexure 210, connected to the base 220. The turbine head can move from side to side, in the direction shown by arrow 202 in FIG. 2. FIG. 2 shows the turbine at reference position. Force, e.g. from a fluid stream 240, can displace the turbine from its reference position. The turbine 200 includes plural turbine blades 204 which are canted to move the turbine based on the fluid flow. The turbine blades are canted such that a fluid flow in the area 240 causes the turbine head or "mass" to move to the right in FIG. 2. This hence bends the flexure 210. Once the mass 200 has moved by a sufficient distance, the turbine blades 240 are moved out of the fluid stream 240. The fluid stream is preferably constrained to an area 240, whereby the turbine can move out of the stream at the end of its oscillatory stroke.

The bending stresses in the flexure then cause the mass to move back towards its original position.

The cycle is later repeated, causing the mass to oscillate in and out of the fluid stream.

FIG. 2 shows the turbine head 200 being formed with a magnetic material 206, which can be located close to another magnetic material to cut lines of force and thereby create a electric field. The opposite scenario can alternately be followed, however, in which the magnetic material is used to move the turbine, and thereby create a fluid flow.

The basic system disclosed above can be extended to multiple turbine heads.

Figure 3A:
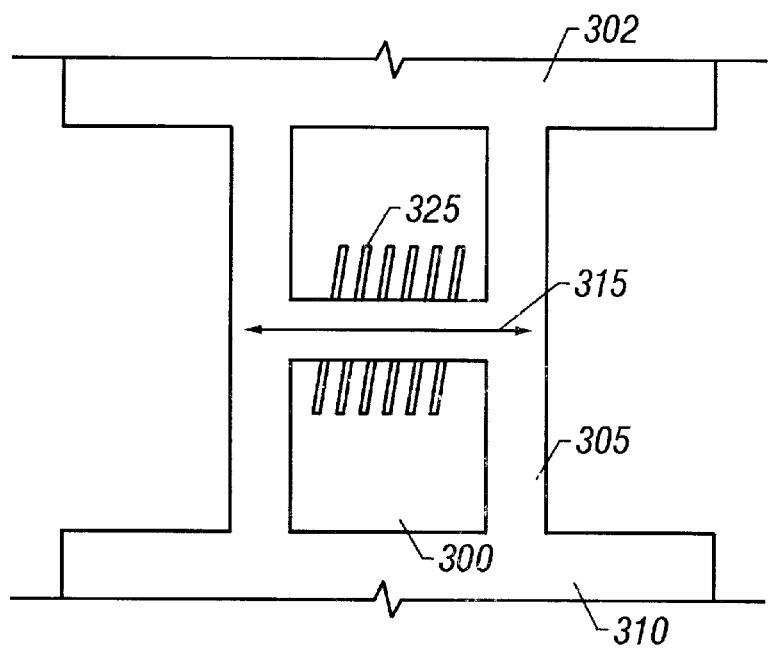
FIGS. 3A and 3B show an alternative embodiment.

FIG. 3A shows a system with two sets of turbine heads 300, 302. These heads are mounted on flexure elements 305 connected to a base 310. The turbine blades oscillate back and forth, along the direction 315. The fluid flow is in the area 325. This flow causes the heads to move in the direction to the right, stretching the flexure 305. When the flexure reaches a point where the fluid flow no longer contacts the blades, the heads return to their original position.

Figure 3B:
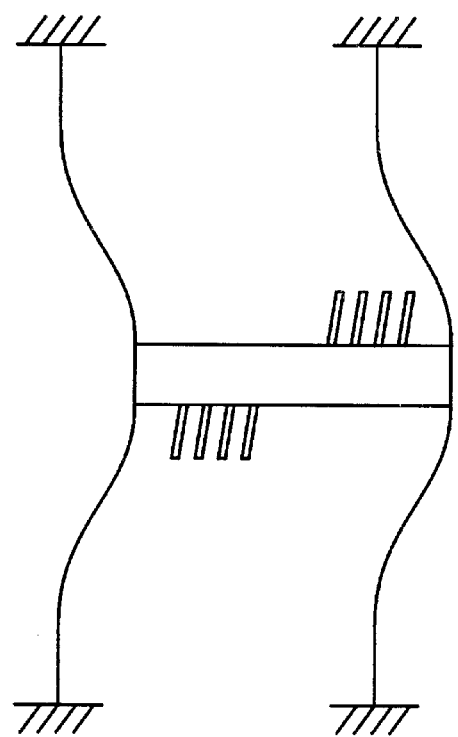

FIG. 3B shows an alternative embodiment in which the blades extend only from a portion of the mass. This permits intermittent engagement with a non-constrained fluid stream.

Figure 4:
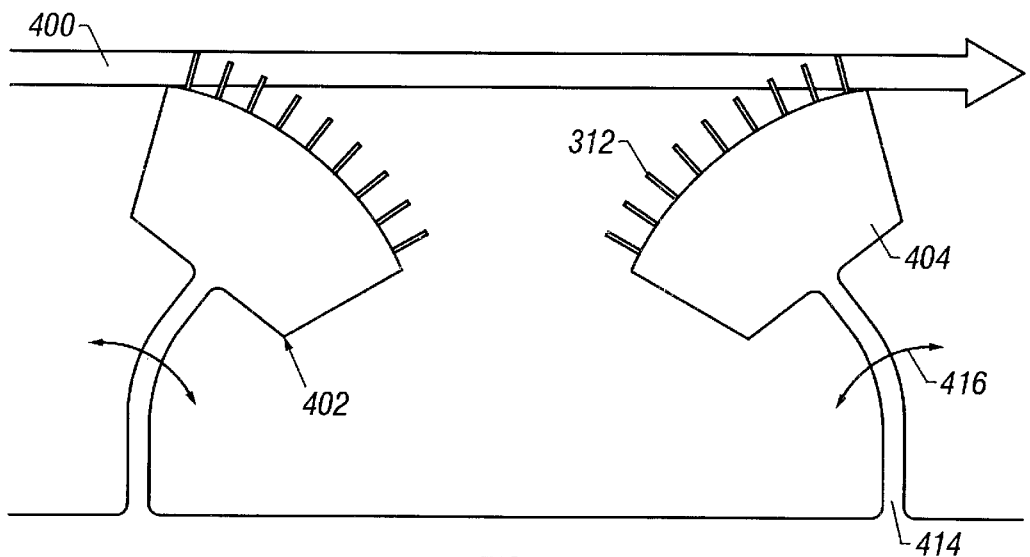
FIG. 4 shows multiple oscillating turbines in a row.

FIG. 4 show an alternative embodiment in which a plurality of oscillating turbine elements 402, 404 are located in a series that is directed along the line of the fluid flow 400. Each turbine includes a mass 410 with fluid-contacting vanes 412. Each of the masses is mounted on a flexure 414 and oscillates in the direction of the arrow 416.

The flow of fluid distorts the position of the mass until the mass is in its maximum distorted position shown as turbine 402. At this point, the force of the flexure causes the turbine to move back into the fluid flow.

Figure 5:
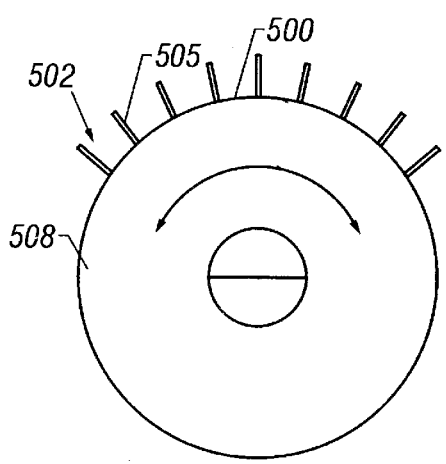
FIG. 5 shows a rotational oscillating turbine.

FIG. 5 show an alternative turbine design that can be used with any of the current or previously described embodiments. A turbine 500 is mounted on a rotational flexure element is used. Vanes 505 are located on only portions of the edge 502, and/or on the top 508. The fluid flow can be either in the plane of the paper or perpendicular to the plane of the paper, either of which still provides interaction with the moving fluid stream. The turbine rotates in one direction, until the blades 505 are out of the fluid flow. At the point, the turbine rotates back.

Figure 6:
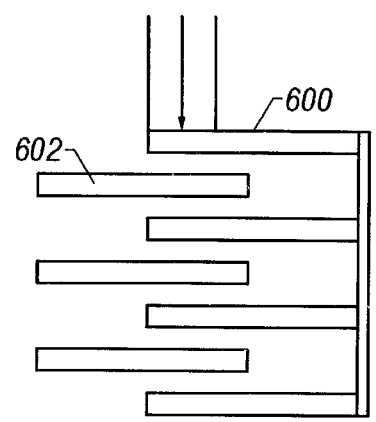
FIG. 6 shows magnets on turbines.

The device can be formed with layers of magnets that move relative to one another. In the view of FIG. 6, the device can be formed of a number of layer which slide relative to one another. The layers are in different relationships with one another depending on the position of the oscillation. The layer 600 overlaps the layer 602. The amount of overlap depends on the angular position of the turbine shown in FIG. 5.

Figure 7:
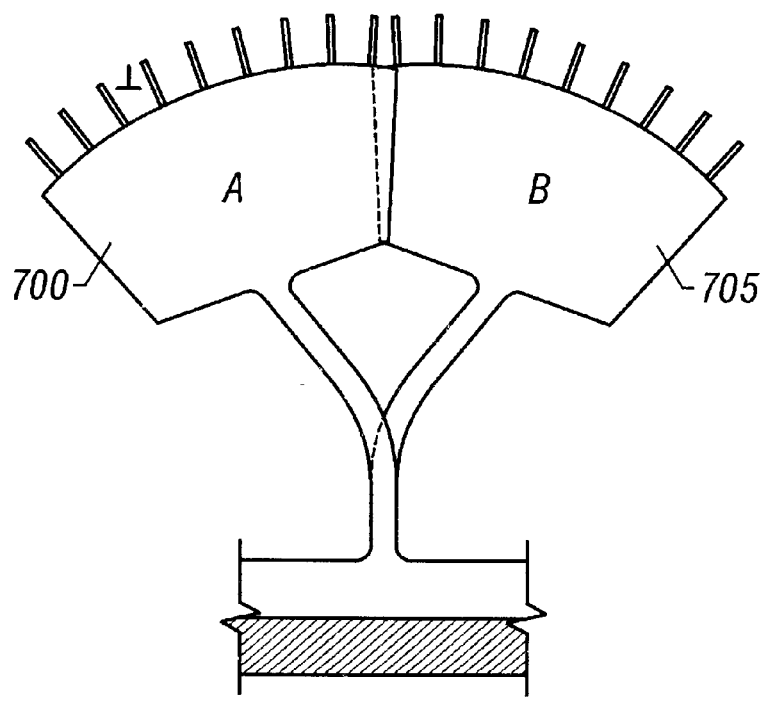
FIG. 7 shows two out of phase turbines formed such that only one will receive thrusts at one time.

FIG. 7 shows an alternative in which a plurality of oscillator heads, e.g. first and second turbine heads 700 and 705 are stacked on top of each other. The oscillators are formed out of phase so that only one will receive fluid thrust at any time. In FIG. 7, oscillator 700 is out of phase with oscillator 705. The flow of fluid stream is perpendicular to the paper in FIG. 7. In this configuration, oscillator A is being thrusted to the right by the fluid. Oscillator B, in contrast, is at the far end of its swing, and hence is starting to be returned by its flexure 710.

In this way, a pair of these oscillators effectively becomes a counter-oscillating system similar to a tuning fork but slightly out of phase. This same system could be extended to any number of different elements.

Figure 8:
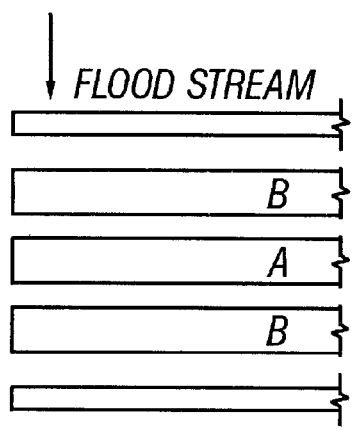
FIG. 8 shows a fluid stream.

FIG. 8 shows a cross sectional view of a stack with multiple pairs of elements. This enables extracting more of the energy from the fluid stream, since each part of the fluid stream contracts a different oscillator. An odd number could produce balanced out-of-plane forces.

Figure 9:
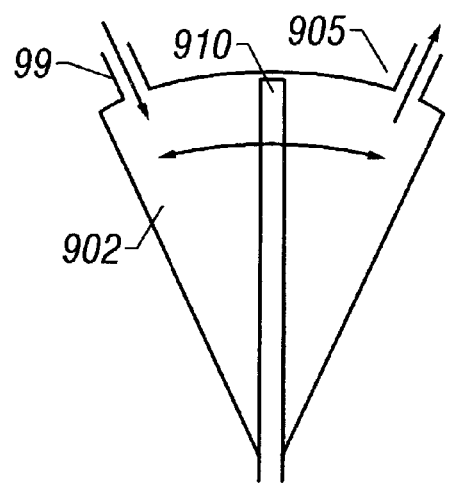
FIG. 9 shows an oscillating microturbine formed of the micro pump.

FIG. 9 shows an alternative embodiment with the turbine configured as an oscillating micro pump. A stream of fluid enters the system through the top port 900. Pressure builds in the left side chamber 902 based on the incoming fluid pressure. This displaces the flexural vein to the right. Once the vein has deflected sufficiently far to expose the exhaust port 905, the pressure in the chamber is relieved. This causes the vein to return towards the center. In this way the vein 910 moves back and forth based on flowing fluid. This concept extracts energy only periodically from the flowing fluid, as the structure oscillates into and out of the fluid stream. However, the system can make use of a large number of similar devices in a composite system. In this way, energy could be continuously extracted from the flowing fluid.

The structures described above can be formed used any structure or material that can be formed using micro electromechanical machining (MEMS).

Although only a few embodiments have been described above, other modifications are possible.

Other modifications are contemplated.

What is claimed is:

1. An oscillating turbine assembly comprising:
   a first moving portion having a magnetic element therein having an outer surface with fluid contacting portions on at least a portion thereof;
   a first flexing portion, whereby said first moving portion oscillates on said first flexing portion.

2. An oscillating turbine assembly comprising:
   a first moving portion having an outer surface with fluid contacting portions on at least a portion thereof;
   a first flexing portion, whereby said first moving portion oscillates on said first flexing portion; and
   an additional moving portion and an additional flexing portion, located in a different location than said first moving portion and the first flexing portions, and positioned to move out of phase with respect to the first portions.

3. An assembly as in claim 2 wherein said turbines are located in series with respect to a direction of fluid flow.

4. An oscillating turbine assembly comprising:
   a first moving portion having an outer surface with fluid contacting portions on at least a portion thereof; and
   a first flexing portion, whereby said first moving portion oscillates on said first flexing portion;
   wherein the fluid contacting portions are located on the first moving portion such that a flow of fluid moves said first moving portion to expose a part of said outer surface which does not have said fluid contacting portions thereon.

5. An assembly as in claim 4 wherein only a specified portion of said weighted portion has said fluid contacting portions thereon.

6. An assembly as in claim 4 further comprising providing fluid flow to only a portion of said weighted portion to bend the flexure.

7. An oscillating turbine assembly comprising:
   a first moving portion having an outer surface with fluid contacting portions on at least a portion thereof; and
   a first flexing portion, whereby said first moving portion oscillates on said first flexing portion;
   wherein said turbines oscillate linearly.

8. A method of operating a microturbine, comprising:
   applying a fluid flow to a microturbine such that said microturbine oscillates first in a first direction and then in a second direction, wherein said directions are linear directions.

9. A method of operating a microturbine, comprising:
   applying a fluid flow to a microturbine such that said microturbine oscillates first in a first direction and then in a second direction; and
   wherein said applying comprises pushing said turbine to a location where it no longer is pressed by fluid flow, subsequently allowing said turbine to return to its original location.

10. A method of operating a microturbine, comprising:
    applying a fluid flow to a microturbine such that said microturbine oscillates first in a first direction and then in a second direction, wherein only a portion of an exterior surface includes fluid contacting elements thereon.

11. A method of operating a microturbine, comprising:
    applying a fluid flow to a microturbine such that said microturbine oscillates first in a first direction and then in a second direction; and
    wherein said turbine has a surface that can be moved by fluid flow, to an area is positioned in a location where its surfaces cause it to be pushed out of the way of fluid flow.

* * * * *